Patented June 6, 1950

2,510,134

UNITED STATES PATENT OFFICE 2,510,134

METHOD FOR PRODUCING MONO-ISOPROPYL QUINOLINE

Salvador F. Orochena and Walter M. Kutz, Pittsburgh, Pa., assignors to Koppers Company, Inc., Pittsburgh, Pa., a corporation of Delaware No Drawing. Application January 26, 1949, Serial No. 72,994

8 Claims. (Cl. 260—283)

This invention relates to derivatives of quinoline. More particularly the invention relates to a process of making mono-isopropyl quinoline.

The mono-isopropyl quinoline of the present invention is a good fixative for perfumery. This product is also an intermediate in the manufacture of quinoline derivatives.

Products such as thiophene, benzene and naphthalene, may be alkylated or isopropylated with propylene by heating in the presence of an alkylation catalyst, such as activated clays. We have found, however, that quinoline may not be isopropylated with propylene with or without the use of an alkylation catalyst. We have know found that quinoline hydrochloride which is formed when quinoline is treated with hydrochloric acid may be alkylated with propylene in the presence of an alkylation catalyst.

The primary object of the present invention is to provide a process of making mono-isopropyl quinoline.

With these and other objects in view the invention consists in the process of alkylating quinoline as hereinafter described and particularly defined in the appended claims.

Our tests have shown that it is not essential to form quinoline hydrochloride before alkylating this compound with propylene but the hydrochloric acid may be directly mixed with quinoline and propylene and the alkylation carried out in the presence of an alumina-silica catalyst. For example, equimolar proportions of quinoline, propylene and hydrochloric acid (36% aqueous solution) may be placed in a glass lined autoclave and placed under high pressure with a gas such as nitrogen, in order to hold the aqueous hydrochloric acid in liquid phase. Furthermore a high pressure which will hold the propylene in liquid phase is desirable in order that the propylene will come into contact with the liquid acid and quinoline while the reaction is being carried on. The mixture in the autoclave is heated to a temperature of 200° to 275° C. and held under this temperature for a period of one to six hours. In this reaction from 25 to 35% of the quinoline will be alkylated with propylene to form mono-isopropyl quinoline. The amount of conversion will depend upon the temperature and the time of reaction. In holding the products in liquid phase a pressure starting at 1000 lbs. may ultimately rise to 2600 lbs. per square inch.

The catalyst is preferably an alumina-silica catalyst wherein the alumina may vary from 20 to 90% and the silica from 80 to 10%. Such a synthetic catalyst is commonly made from the gelatinous alumina and silica and calcined. We have also found that natural clays, such as Filtrol and other alumina-silicates when treated with acid to make them more reactive, are good alkylation catalysts.

After the products have been reacted they preferably are neutralized with a 30% sodium hydroxide solution, the mono-isopropyl quinoline extracted with benzene and the benzene extract distilled to separate the benzene solvent from the mono-isopropyl quinoline. Other solvents, such as xylene and toluene, may be used for extracting the mono-isopropyl quinoline from the reaction mass.

The following is a typical example: Quinoline 452 g. (3.5 mols), propylene 147 g. (3.5 mols), hydrochloric acid (HCl 36% aqueous) 355 g. (3.4 mols) were heated at 250° C. for six hours wherein the maximum pressure was 2600 lbs. per square inch. The product was filtered to separate catalyst and neutralized with 30% NaOH. The neutralized product was then treated with benzene and a benzene extract separated. The benzene extract was distilled at 10 mm. pressure to recover a mono-isopropyl quinoline with the following properties: a boiling point range of 148 to 149° C., at 10 mm. pressure, a refractive index of 1.5880 $N_D^{20}$, density of 1.0236 $D_4^{20}$, molecular weight 172.7, nitrogen content 8.0%. The product is a liquid of reddish color. The mono-isopropyl quinoline recovered represented a 26.3% yield based on quinoline.

The preferred form of the invention having been thus described, what is claimed as new is:

1. A process of producing mono-isopropyl quinoline comprising: reacting quinoline hydrochloride in aqueous solution with propylene in the presence of an alumina-silica catalyst, neutralizing the reaction product with caustic, extracting the alkylate with a solvent and distilling the extract to separate mono-isopropyl quinoline.

2. A process of producing mono-isopropyl quinoline comprising: reacting quinoline with aqueous hydrochloric acid and propylene in the presence of an alumina-silica catalyst, neutralizing the reaction product with a caustic, extracting the alkylate with a solvent and distilling to separate mono-isopropyl quinoline.

3. The process defined in claim 2 in which the quinoline, propylene, and hydrochloric acid are reacted in approximately equimolar proportions.

4. The process defined in claim 2 in which the reaction is carried out under sufficient pressure to hold the aqueous hydrochloric acid in liquid phase and to bring the propylene into contact with the liquid.

5. The process defined in claim 2 in which the catalyst is an activated clay.

6. The process defined in claim 2 in which a pressure of 800 to 2600 lbs. per square inch is maintained during the reaction.

7. The process defined in claim 2 in which the hydrochloric acid is a 36% aqueous solution.

8. The process defined in claim 2 in which the reaction mixture is heated to a temperature of 200° to 275° C. for a period of one to six hours while being actively stirred.

SALVADOR F. OROCHENA.
WALTER M. KUTZ.

No references cited.